Jan. 17, 1939.    E. W. TAYLOR    2,144,319
METHOD OF MAKING WELDED CHAIN
Filed March 26, 1938
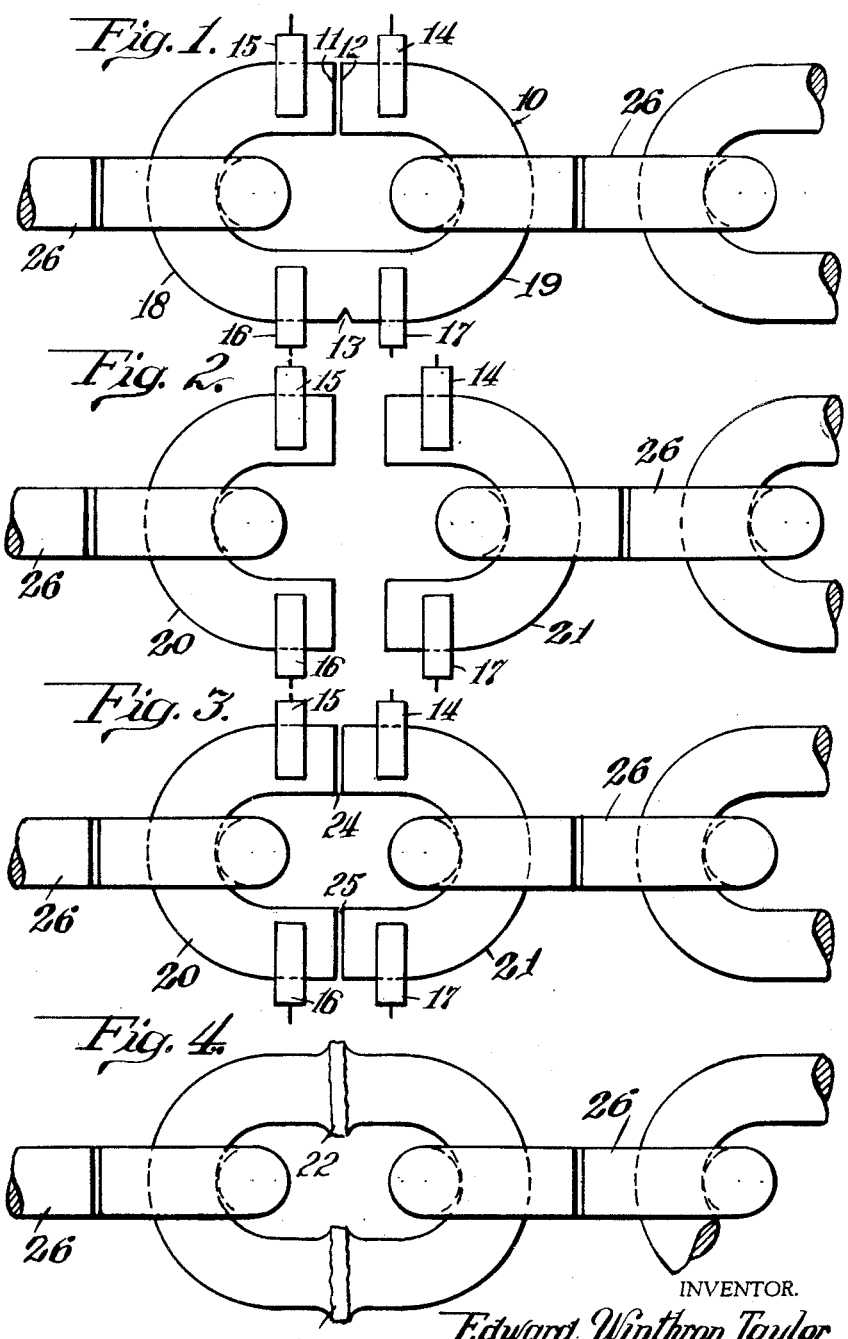
INVENTOR.
Edward Winthrop Taylor
BY
ATTORNEY.

Patented Jan. 17, 1939

2,144,319

UNITED STATES PATENT OFFICE 2,144,319

METHOD OF MAKING WELDED CHAIN

Edward Winthrop Taylor, Hammond, Ind., assignor to S. G. Taylor Chain Co., Hammond, Ind., a corporation of Illinois Application March 26, 1938, Serial No. 198,172

4 Claims. (Cl. 219—10)

This invention relates to the manufacture of metal chains and, more particularly, to a method of electrically welding a chain link.

According to one of the methods commonly employed in the manufacture of chains, the stock from which the link is made is bent on a mandrel, or in other suitable manner, so that the ends thereof are in abutting relation. The ends are then heated to a plastic state by means of an electric current and pressed together to form a weld.

A weld produced by such method is not as strong as desired for certain purposes for the reason that the welding operation results in opposing strains adjacent each side of the weld which tend to rupture or open up the weld. In other words, the welding operation shortens the welded side of the link to some extent and the strains thus developed serve to weaken the weld even after the metal has cooled.

This objection has heretofore been avoided to a considerable extent by forming the link from two similar U-shaped link segments. By such method undesirable strains are eliminated entirely if the two welds are identical and are present only to an inconsequential degree if the welds happen to lack uniformity. However, the welding of chain links from two U-shaped link segments is objectionable from a manufacturing standpoint in that it not only requires a separate operation to form two complementary segments but also the method presents handling difficulties. That is, instead of handling a single piece, two pieces must be separately handled and carefully positioned in proper alignment for the welding operation.

The principal object of the present invention is to provide a welded chain link which is free from all of the objections above noted.

A further object of the invention is to provide an improved method of forming and welding together two U-shaped link segments.

These and further objects will more fully appear from the following detail description with reference to the accompanying drawing, wherein Figs. 1 to 4 illustrate diagrammatically the respective steps of one embodiment of the present invention.

Referring first to Fig. 1, reference character 10 designates a length of link stock formed into the shape of a link with its ends 11 and 12 in non-contacting but closely spaced relationship. The central portion of the stock is notched at 13 for a purpose to be presently described. The depth of the notch may be varied but satisfactory results are obtained with a notch corresponding to 1/16 inch on a 5/8 inch diameter stock. If desired, the notch may be extended around all or a part of the circumference of the stock to form a groove.

Removably clamped adjacent the ends 11 and 12 are electrodes 14 and 15. Similarly, electrodes 16 and 17 are clamped adjacent each side of the notch 13.

The two sets of electrodes 14, 15 and 16, 17 are connected to a source or sources of electricity (not shown) in any suitable manner but, for purposes of the present invention, it will not ordinarily be necessary that they be on separate circuits.

The ends 18 and 19 of the unwelded link are each supported by any suitable means (not shown) to hold the link firmly in position, said respective supporting means being relatively movable only along a line passing through the axes of the opposing end faces 11, 12. That is to say, the respective supporting means should be so mounted that any relative movement of the supporting means, when the link is divided into two segments (in the manner to be presently described), will maintain the opposing ends of the segments in axial alignment.

The supporting means for the link and the details of the electrodes will be readily understood by anyone familiar with the welding art and are, therefore, not shown in the drawing.

When the parts are assembled as shown in Fig. 1, a suitable welding current is passed through electrodes 16, 17. The portion of the link adjacent the notch 13, being of smaller diameter than the rest of the link stock, will then, because it presents the point of highest resistance, quickly reach a molten state. At the same time the supporting means for end 18 of the link is pulled in the direction away from end 18, whereby, when the metal adjacent the notch 13 reaches a molten state, the link 10 is severed to provide two separate but aligned link segments 20, 21, as indicated in Fig. 2.

The opposing ends of the two U-shaped link segments may then be readily brought together and electrically welded, in any suitable manner, by energizing electrodes 14, 15 and 16, 17. If the commonly employed butt-welding method is used, actual separation and re-engagement of the link segments (as shown in Figs. 2 and 3) need not necessarily be effected. By passing a current through the portion of reduced diameter (13) and also passing a current between the ends 11, 12 and then, when the metal adjacent both resistance areas reaches a welding consistency, exerting endwise pressure on the link, the link will have, in effect, two separate welds each substantially free from undesirable strains.

However, the present invention, as will be noted, is readily adapted for use in connection with flash welding according to which an electric current is passed between the respective opposing end portions while the same are in spaced relationship, thus providing an arc. As soon as the desired plastic condition is obtained by virtue of the heat produced by the arc, the plastic ends are pressed together, as in butt-welding. By virtue of the above described manner in which the two segments are mounted the proper adjustment of the relative position of the respective opposing end portions may be readily obtained both to draw the desired arc and to complete the welding operation.

Fig. 3 illustrates the relative position of the segments at the beginning of the flash welding operation. Current is supplied to the electrodes and the relative position of the segments 21, 22 is adjusted to provide an arc across the spaces 24, 25 between respective opposing ends thereof. When the metal adjacent each arc reaches the desired welding consistency, the segments are pressed together, to form the welds, as indicated at 22, 23, Fig. 4.

With both butt-welding and flash-welding, the pressure exerted in forming the weld should be approximately 1200 pounds per square inch, although the exact amount of pressure will vary with different materials and under individual welding practices.

For ordinary purposes, particularly when welding low carbon steels, the butt-welding method will give satisfactory results. However, as above mentioned, the present invention is readily adaptable for flash welding under circumstances wherein that method is indicated.

It will be seen that the method above described, regardless of the particular type of welding employed, not only avoids any undesirable strains but also possesses certain distinct advantages over the commonly employed method of starting with two separate U-shaped link segments. For example, with the above described method it is unnecessary to cut, handle and properly juxtapose or align two units. A single unit, in the form of a complete link, is clamped into position and, when severed as above described, the parts are in perfect alignment, the supporting means not being capable of movement except longitudinally of the axis of the link. Furthermore, the link stock is severed at any desired spot, predetermined by the position of the groove or notch 13.

Obviously, if desired, the link may be severed in its supported position by mechanical means, such as a saw or a narrow abrasive, without departing from the scope of the present invention. However, the method as above described is generally preferred.

It will be understood that the above description is merely typical and various modifications or substitutions may be made without departing from the scope of the invention. The notch 13, as shown in Fig. 1, could well be in the form of a groove around all or a part of the circumference of the stock. Likewise the supporting members may both be movable with relation to the other or either could be fixed provided the other is movable.

It should be noted, of course, that if the ordinary butt welding method is employed, the notch 13 may be omitted. That is to say, if a separate current is passed through electrodes 16 and 17 the metal between these two electrodes will, even in the absence of a notch or groove 13, become sufficiently plastic to be upset when endwise pressure is applied to weld the ends 11 and 12 thus relieving or avoiding any undesirable strains which might otherwise develop.

It is also noted that if two separate circuits are employed it is not necessary that the ends 11 and 12 be in noncontacting relationship, as indicated in the drawing. If two separate circuits are employed, the ends 11 and 12 may, in the first instance, be in abutting engagement, in which case current may be initially applied to electrodes 16 and 17 and then, at a later stage in the operation, the other set of electrodes may be energized.

The term "weld", as employed in the above specification and in the appended claims, is used in its broader sense to include the application of heat and pressure to a single length of link stock, without necessarily involving actual previous separation thereof into two pieces.

Obviously, in the manufacture of a chain by the method above described, the link, before being welded, will be threaded to another link or links 26, and means provided for turning either the chain or the supporting and welding means through 90° to provide a continuous operation in welding a complete chain.

It is the intention to cover all modifications and variations within the scope of the following claims.

I claim:

1. Method of making a metal chain having welded links which comprises forming a chain having unwelded links, each of the unwelded links comprising a single length of link stock with opposed ends in close relationship; rigidly supporting one of the unwelded links at one side of the opposing ends; rigidly but movably supporting the opposite side of said link; severing the link on the side opposite the opposing ends to form two supported complementary link segments having two pairs of opposing ends; separating the two link segments thus produced; passing an electric current between said respective opposing ends to provide a welding temperature; pressing the respective pairs of ends together to integrally unite them; and similarly treating each such unwelded link making up the chain.

2. Method of making a welded metal chain which comprises forming a chain from a plurality of single lengths of unwelded link stock threaded together with the opposed ends of each link in close relationship; rigidly supporting one side of one of said links; rigidly but movably supporting the opposite side of said link; severing the link to form two supported complementary link segments having two pairs of opposing ends; separating the two link segments thus produced; passing a current between said respective opposing ends to provide a welding temperature; pressing said respective pairs of ends together to integrally unit the same and similarly treating the other unwelded links forming the chain.

3. Method of making a welded chain which comprises forming a chain from a plurality of single lengths of unwelded link stock threaded together with the opposed ends of each link in close relationship, each link being provided with a point of reduced diameter; rigidly supporting one of said links intermediate one end and the point of reduced diameter; rigidly but movably supporting the opposite side of said link; passing an electric current through the point of reduced diameter to sever the stock at said point; separating the two complementary link segments thus produced; passing a current between said ends to provide a welding temperature; pressing the respective pairs of ends together to integrally unite the same and similarly treating the other unwelded links forming the chain.

4. Method of making a welded chain which comprises forming a chain from a plurality of single lengths of unwelded link stock threaded together with the opposed ends of each link in close relationship, each link being provided with a point of reduced diameter substantially midway between each end; rigidly supporting one of said links intermediate one end and the point of reduced diameter; rigidly but movably supporting the opposite side of said link; passing an electric current through the point of reduced diameter to sever the stock at said point; separating the two complementary link segments thus produced; adjusting the space between the opposing ends of said segments; passing a current between said ends to provide a welding temperature; pressing the respective pairs of ends together to integrally unite the same and similarly treating the other unwelded links forming the chain.

EDWARD WINTHROP TAYLOR.

CERTIFICATE OF CORRECTION.

Patent No. 2,144,319. January 17, 1939.

EDWARD WINTHROP TAYLOR.

It is hereby certified that error appears in the printed specification of the above numbered patent requiring correction as follows: Page 2, second column, line 68, claim 2, for the word "unit" read unite; line 73, claim 3, for "withthe" read with the; and that the said Letters Patent should be read with this correction therein that the same may conform to the record of the case in the Patent Office.

Signed and sealed this 2nd day of May, A. D. 1939.

Henry Van Arsdale

Acting Commissioner of Patents.

(Seal)